(12) United States Patent
Kling

(10) Patent No.: US 7,956,771 B2
(45) Date of Patent: Jun. 7, 2011

(54) COMPACT ALPHANUMERIC KEYBOARD

(75) Inventor: Ralph M. Kling, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/939,892

(22) Filed: Nov. 4, 2010

(65) Prior Publication Data

US 2011/0059766 A1  Mar. 10, 2011

Related U.S. Application Data

(63) Continuation of application No. 11/879,834, filed on Jul. 18, 2007, now Pat. No. 7,839,390, which is a continuation of application No. 09/561,409, filed on Apr. 27, 2000, now Pat. No. 7,265,745.

(51) Int. Cl.
*H03K 17/94* (2006.01)
(52) U.S. Cl. ............ 341/22; 345/168; 345/169; 708/145
(58) Field of Classification Search ............... 341/21, 341/22; 345/168, 169; 400/472, 489; 708/130, 708/145
See application file for complete search history.

(56) References Cited

U.S. PATENT DOCUMENTS

| | | | |
|---|---|---|---|
| 4,549,279 A | 10/1985 | Lapeyre | |
| 4,825,019 A | 4/1989 | Fisher | |
| 4,891,777 A | 1/1990 | Lapeyre | |
| 4,994,992 A | 2/1991 | Lapeyre | |
| 5,034,574 A | 7/1991 | Martovitz | |
| 5,117,455 A | 5/1992 | Danish | |
| 5,336,002 A | 8/1994 | Russo | |
| 5,528,235 A | 6/1996 | Lin et al. | |
| 5,612,690 A | 3/1997 | Levy | |
| 5,793,312 A | 8/1998 | Tsubai | |
| 5,861,588 A * | 1/1999 | Gillot | 200/5 A |
| 5,973,621 A * | 10/1999 | Levy | 341/22 |
| 5,984,549 A | 11/1999 | Schaffer | |
| 5,990,872 A | 11/1999 | Jorgenson et al. | |
| 6,005,498 A | 12/1999 | Yang et al. | |
| 6,212,066 B1 | 4/2001 | Fetterman | |
| 6,262,716 B1 | 7/2001 | Raasch | |
| 6,377,685 B1 | 4/2002 | Krishnan | |
| 6,677,541 B1 * | 1/2004 | Rapeli | 200/5 A |
| 7,265,745 B1 | 9/2007 | Kling | |
| 7,839,390 B2 * | 11/2010 | Kling | 345/169 |

(Continued)

FOREIGN PATENT DOCUMENTS

DE   8811954 U1   11/1988

(Continued)

OTHER PUBLICATIONS

PCT International Search Report for International Application No. PCT/US01/40446, mail date Jun. 20, 2002, 7 pages.

(Continued)

*Primary Examiner* — Timothy Edwards, Jr.
(74) *Attorney, Agent, or Firm* — Blakely, Sokoloff, Taylor & Zafman LLP

(57) ABSTRACT

An apparatus comprises an input keypad having a plurality of keys. The input keypad outputs an output signal that is indicative of either a single depressed key or a plurality of depressed keys. The apparatus includes a processor for receiving the output signal by the input keypad and associating an alphabetic character with the output signal.

9 Claims, 5 Drawing Sheets

U.S. PATENT DOCUMENTS

2009/0102685 A1* 4/2009 Lassesson et al. .............. 341/23

FOREIGN PATENT DOCUMENTS

| DE | 197 16 788 | 10/1998 |
|---|---|---|
| EP | 0 540 147 A2 | 5/1993 |
| FR | 2 746 524 | 9/1997 |
| WO | WO 96 38776 | 12/1996 |

OTHER PUBLICATIONS

PCT Written Opinion for International Application No. PCT/US01/40446, mail date Feb. 5, 2003, 4 pages.

U.S. Office Action mailed on Jan. 14, 2002, U.S. Appl. No. 09/561,409, filed Apr. 27, 2000, 6 pages.

U.S. Office Action mailed on Jun. 19, 2002, U.S. Appl. No. 09/561,409, filed Apr. 27, 2000, 8 pages.

U.S. Office Action mailed on Sep. 16, 2002, U.S. Appl. No. 09/561,409, filed Apr. 27, 2000, 3 pages.

U.S. Office Action mailed on Nov. 20, 2002, U.S. Appl. No. 09/561,409, filed Apr. 27, 2000, 6 pages.

U.S. Office Action mailed on May 22, 2003, U.S. Appl. No. 09/561,409, filed Apr. 27, 2000, 7 pages.

U.S. Office Action mailed on Aug. 6, 2003, U.S. Appl. No. 09/561,409, filed Apr. 27, 2000, 3 pages.

USPTO Communication re Examiner's Answer in response to Appeal Brief mailed on Jun. 2, 2004, U.S. Appl. No. 09/561,409, filed Apr. 27, 2000, 13 pages.

USPTO Communication mailed on Oct. 20, 2004, U.S. Appl. No. 09/561,409, filed Apr. 27, 2000, 2 pages.

USPTO Communication mailed on Aug. 4, 2005, U.S. Appl. No. 09/561,409, filed Apr. 27, 2000, 3 pages.

USPTO Communication mailed on Aug. 18, 2005, U.S. Appl. No. 09/561,409, filed Apr. 27, 2000, 5 pages.

USPTO Board of Appeals Decision mailed on Aug. 28, 2006, U.S. Appl. No. 09/561,409, filed Apr. 27, 2000, 10 pages.

U.S. Notice of Allowance mailed on Dec. 29, 2006, U.S. Appl. No. 09/561,409, filed Apr. 27, 2000, 4 pages.

U.S. Notice of Allowance mailed on May 2, 2007, U.S. Appl. No. 09/561,409, filed Apr. 27, 2000, 5 pages.

U.S. Office Action mailed on Mar. 31, 2010, U.S. Appl. No. 11/879,834, filed Jul. 18, 2007, 10 pages.

U.S. Notice of Allowance mailed on Jul. 14, 2010, U.S. Appl. No. 11/879,834, filed Jul. 18, 2007, 9 pages.

* cited by examiner

COMPACT ALPHANUMERIC KEYBOARD

CROSS-REFERENCE TO RELATED APPLICATIONS

This application is a continuation of, and claims priority under 35 U.S.C. §120 from, U.S. patent application Ser. No. 11/879,834, filed 18 Jul. 2007 now U.S. Pat. No. 7,839,390 which in turn is a continuation of U.S. patent application Ser. No. 09/561,409, filed 27 Apr. 2000 and now U.S. Pat. No. 7,265,745.

TECHNICAL FIELD OF THE INVENTION

The present invention relates to input keypads, and more particularly, to an input keypad that can be used for alphanumeric input.

BACKGROUND OF THE INVENTION

Many types of modern electronic devices employ an input keypad as the user interface. The most commonly used input keypad, used primarily with phones, is shown in FIG. 1. This input keypad includes 12 keys, 10 keys for each of the numerals 0-9, a "#" key, and a "*" key. Moreover, the keys having numerals 2-9 each have various alphabetic characters associated therewith. As seen in FIG. 1, the alphabetic characters are printed on the keys in a sequence.

Using the input keypad of FIG. 1, entering numerals is straightforward. However, the entering of alphabetic characters is very cumbersome, since there are not enough keys to represent all of the letters. Various schemes have been used to allow the input keypad of FIG. 1 to enter the full range of alphabetic characters. In most schemes, the user has to cycle through a series of keypad inputs to enter the desired letter. There is also typically a numeric/alphabetic toggle switch that switches the input keypad between numeric and alphabetic modes.

Assuming that the input keypad is in alphabetic mode, in one scheme, an alphabetic character is input by depressing the key associated with that character either 1, 2, 3 or 4 times, depending upon where the character appears in the character sequence printed on the key. Therefore, the letter A would be entered by depressing the "2" key once, the letter B may be entered by depressing the "2" key twice, and the letter C may be entered by depressing the "2" key three times. Continuing with this example, the word "HELLO" would be entered by depressing the key sequence 44, 33, 555, 555, 666. Using this method, the word "HELLO" requires thirteen keystrokes. This approach is relatively cumbersome.

DETAILED DESCRIPTION OF THE ILLUSTRATED EMBODIMENTS

Figure 2:
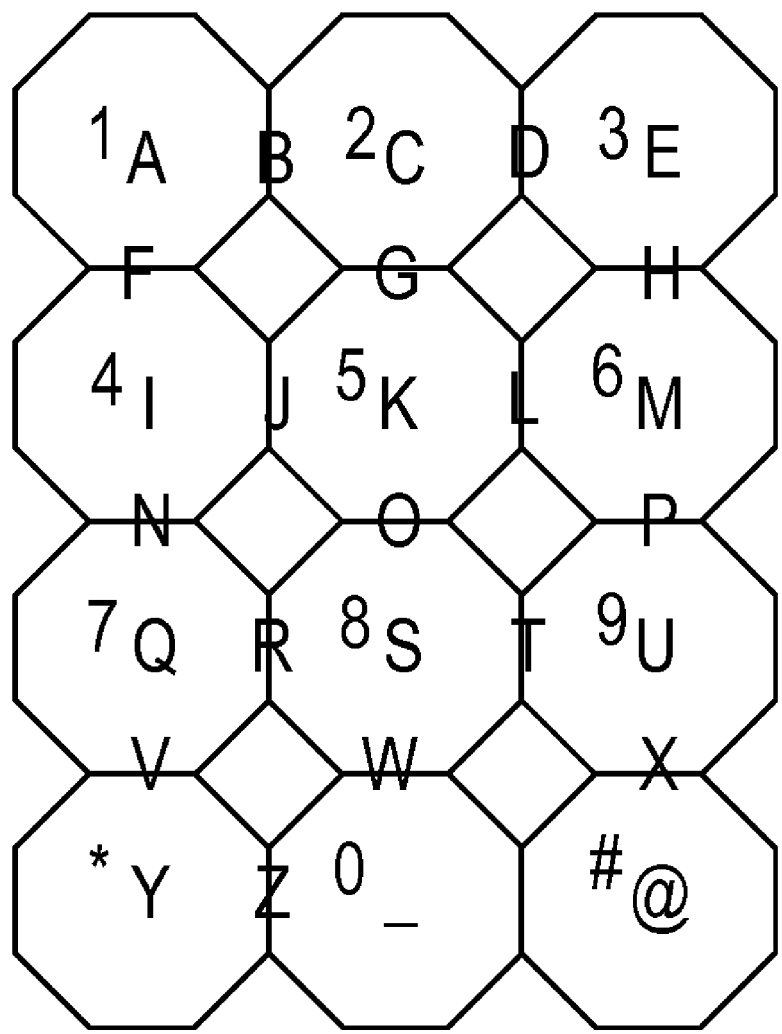
FIG. 2° is an illustration of an input keypad formed in accordance with the present invention.

Referring to FIG. 2, the present invention takes advantage of the fact that a user can depress adjacent keys in an input keypad 201 simultaneously in a single stroke or action. This effectively creates a higher density grid onto which characters can be mapped. As seen in FIG. 2, alphabetic letters are mapped to either one of the 12 keys 203 on the input keypad 201 or various combinations of two adjacent keys in the input keypad 201.

Thus, a user can press either one or two of the keys to represent an alphabetic letter. The terms alphabetic letter or alphabetic character as used herein shall mean any symbol of any language used for any communication purposes, including punctuation and special symbols. Thus, the terms alphabetic letter or alphabetic character is not limited to the commonly used English letters A-Z.

In the specific embodiment shown in FIG. 2, the letter "A" can be input by the user by depressing the numeral "1" key, the letter "C" can be input by the user by depressing the numeral "2" key, the letter "E" can be input by the user by depressing the numeral "3" key, and the letter "I" can be input by the user by depressing the numeral "4" key. Further, the letter "K" can be input by the user by depressing the numeral "5" key, the letter "M" can be input by the user by depressing the numeral "6" key, the letter "Q" can be input by the user by depressing the numeral "7" key, the letter "S" can be input by the user by depressing the numeral "8" key, the letter "U" can be input by the user by depressing the numeral "9" key, and the letter "Y" can be input by the user by depressing the "*" key. Finally, the "space" character can be input by depressing the numeral "0" key and the "@" character can be input be depressing the "#" key.

The other letters of the alphabet can be entered by pressing two adjacent keypads together. Again, in the specific example shown in FIG. 2, the letter "B" can be input by the user by the simultaneous depression of the numeral "1" key and numeral "2" key. The letter "D" can be input by the user by the simultaneous depression of the numeral "2" key and numeral "3" key. The letter "F" can be input by the user by the simultaneous depression of the numeral "1" key and numeral "3" key. The letter "G" can be input by the user by the simultaneous depression of the numeral "2" key and numeral "5" key.

The letter "J" can be input by the user by the simultaneous depression of the numeral "4" key and numeral "5" key. The letter "L" can be input by the user by the simultaneous depression of the numeral "5" key and numeral "6" key. The letter "H" can be input by the user by the simultaneous depression of the numeral "3" key and numeral "6" key. The letter "N" can be input by the user by the simultaneous depression of the numeral "4" key and numeral "7" key. The letter "O" can be input by the user by the simultaneous depression of the numeral "5" key and numeral "8" key. The letter "P" can be input by the user by the simultaneous depression of the numeral "6" key and numeral "9" key.

The letter "R" can be input by the user by the simultaneous depression of the numeral "7" key and numeral "8" key. The letter "T" can be input by the user by the simultaneous depression of the numeral "8" key and numeral "9" key. The letter "V" can be input by the user by the simultaneous depression of the numeral "7" key and "*" key. The letter "W" can be input by the user by the simultaneous depression of the numeral "8" key and "0" key. The letter "X" can be input by the user by the simultaneous depression of the numeral "9" key and "#" key. The letter "Z" can be input by the user by the simultaneous depression of the "*" key and numeral "0" key. Finally, the letter "." can be input by the user by the simultaneous depression of the numeral "0" key and "#" key.

Note importantly that the method and apparatus of the present invention can be implemented with little or no mechanical design changes to existing input keypads. For example, the standard mobile phone input keypad of FIG. 1 can be used if the keys protrude enough for the user to be able to press adjacent keys simultaneously. The implementation of the invention is primarily in the hardware or software that interprets the signals from the input keypad 201.

Figure 3A:
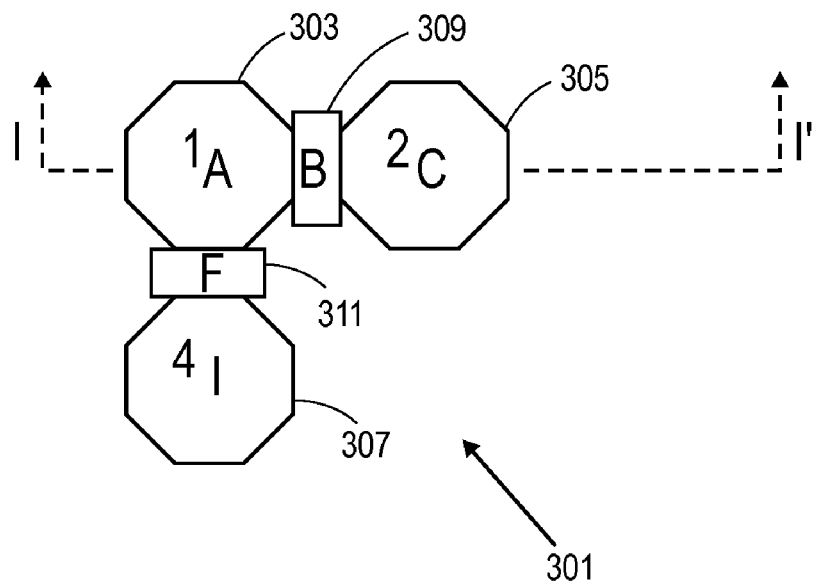
FIG. 3A° illustrates a detail of a section of the input keypad of FIG. 2.
Figure 3B:
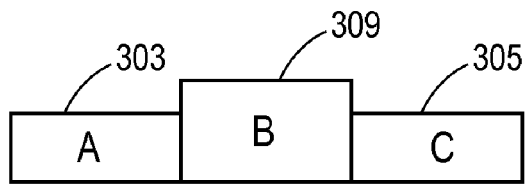
FIG. 3B is a cross-section taken along line 1-1' of FIG. 3A.

Nevertheless, turning to FIG. 3A, it is another aspect of the present invention to modify a conventional input keypad with a small "dummy" key 309 and 311 that can be inserted between the conventional keys of the input keypad to convey the usage model to the user by both visual and tactile means. Note that the dummy key 309 and 311 are of different shape than the conventional keys 303, 305, and 307. Thus, not all keys that perform similar functions (e.g. generate characters) are shaped in the same way. Furthermore, as seen in FIG. 3B, the height of the dummy keys 309 and 311 is preferably raised from the conventional keys. This gives the advantage of tactile feedback to the user. Additionally, the dummy keys may be differentiated by having a different physical size or shape. Furthermore, the dummy keys may be mechanically connected to the two adjacent keys to facilitate operation.

Specifically, as seen in FIG. 3A, a portion of an input keypad 301 is shown. The numeral "1" key 303 is to the left of the numeral "2" key 305. Also, the numeral "4" key 307 is beneath the numeral "1" key 303. Unlike the conventional input keypad of FIG. 1, the portion of an input keypad 301 further includes dummy keys 309 and 311. The dummy key 309 represents the letter "B" and the dummy key 311 represents the letter "F". These dummy keys 309 and 311 when depressed do not actually cause the input keypad 301 to output a signal. Rather, the dummy keys 309 and 311 are situated such that a user depressing one of the dummy keys will in actuality be depressing both of the adjacent keys to the dummy key. For example, if the dummy key 309 is depressed by the user, this causes the numeral "1" key 303 and the numeral "2" key 305 to be depressed. Further, if the dummy key 311 is depressed by the user, this causes the numeral "1" key 303 and the numeral "4" key 307 to be depressed.

Figure 4:
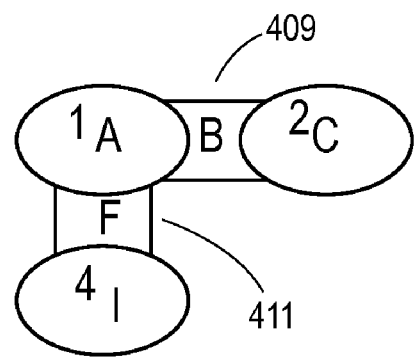
FIG. 4° illustrates an alternative embodiment of one section of the input keypad of FIG. 2.

As shown in FIG. 3A, in the preferred embodiment, the dummy keys 309 and 311 are identified with characters that indicate to the user the usage model for that dummy key. For clarity, it can be appreciated that FIG. 3A only shows a portion of an input keypad formed in accordance with the present invention. FIG. 4 shows an alternative embodiment of an input keypad wherein the dummy keys 409 and 411 are elongated mechanical members. This embodiment is useful when the keys of the input keypad are more spaced apart from each other.

In an alternative embodiment, the dummy keys 309, 311, 409, and 411 may be electrically active. In other words, the dummy keys when depressed will cause its own distinct electrical signal to be output by the input keypad. This embodiment presents a more robust input keypad. It can be appreciated that in certain instances, the conventional keys 305, 307, and 309 may not be fully depressed even if the dummy key is depressed. This may be a result of improper user pressure on the dummy key, environmental conditions, failure of the electrical contact for the conventional keys, or other reasons. By having the dummy keys have their own electrical contact, fault tolerance of the input keypad is increased. The following table shows how the keyboard controller would respond to various combinations of input for dummy key 309 and conventional keys 303 and 305. The numeral "1" indicates that an electrical signal is transmitted by the corresponding depressed key. The numeral "0" indicates that the corresponding key is not depressed and therefore does not generate an active electrical signal.

| "A" | "B" | "C" | Result |
|---|---|---|---|
| 0 | 0 | 0 | None |
| 1 | 0 | 0 | A |
| 0 | 1 | 0 | B |
| 1 | 1 | 0 | B |
| 0 | 0 | 1 | C |
| 1 | 0 | 1 | B |
| 0 | 1 | 1 | B |
| 1 | 1 | 1 | B |

Returning to FIG. 2, the assignment of alphabetic letters to various keys and key combinations is in alphabetic order from left to right, top to bottom. However, it can be appreciated that the assignment of alphabetic letters to the various keys and key combinations is arbitrary and may be varied dependent upon ascertained or perceived user preference.

Figure 6:
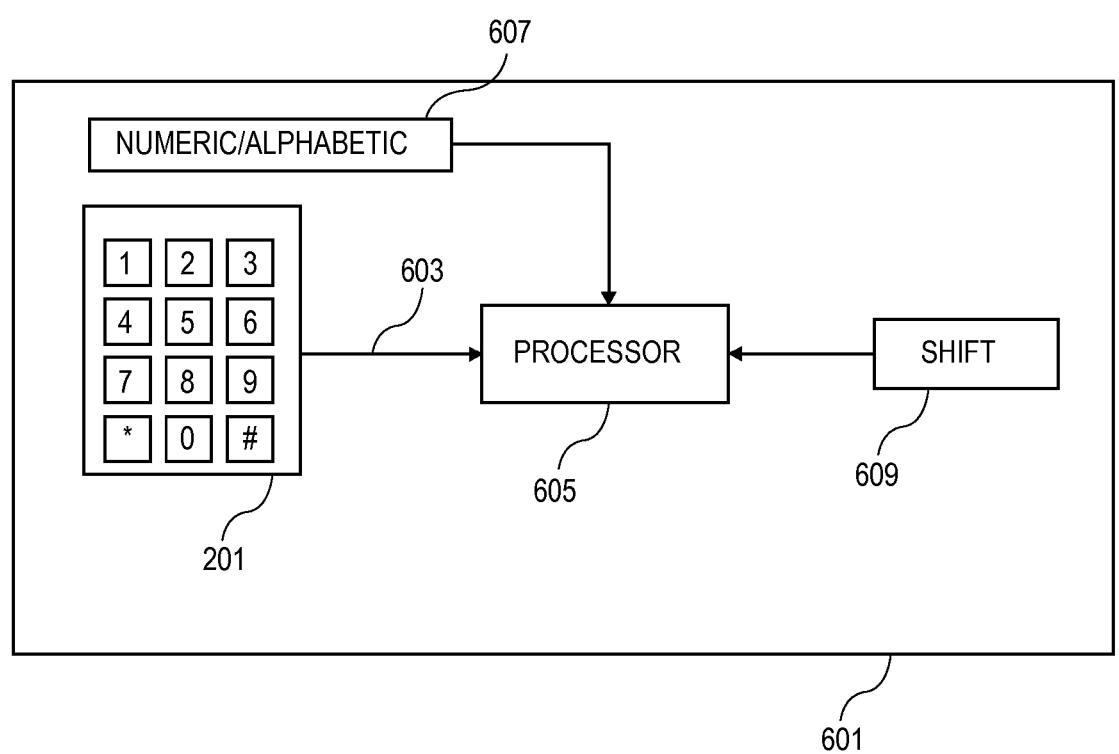
FIG. 6 is a schematic diagram of a device that uses the input keypad of the present invention.

The input keypad 201 by itself is not a useful apparatus. In other words, as seen in FIG. 6, there is an underlying associated device 601 that uses the input keypad 201 as a user interface. In a typical application, the input keypad 201 is the user interface for a phone (i.e., the associated device). The associated device 601 that uses the signals output by the input keypad must be adapted to properly interpret the output signals.

The portion of the associated device 601 that interprets the signals from the input keypad may either by hardware or software. In the preferred embodiment, computer instructions are executed by a processor 605 in the associated device 601 to interpret the signals output by the input keypad 201. The processor 605 is also known as a keypad controller.

The processor 605 receives the signals from the input keypad 201 via an internal bus 603. It is the responsibility of the processor 605 to interpret the signals received on the internal bus 603. In the preferred embodiment, the processor 605 includes non-volatile memory that has stored thereon a set of rules for interpreting the signals from the input keypad 201. For example, a simple look up table may be used to associate the alphabetic letter with the keys depressed. Continuing with the example shown in FIG. 2, the look up table may be as follows:

| Keypad Signal(s) | Letter |
|---|---|
| 1 | A |
| 1 and 2 | B |
| 2 | C |
| 2 and 3 | D |
| 3 | E |
| 1 and 4 | F |
| 2 and 5 | G |
| 3 and 6 | H |
| 4 | I |
| 4 and 5 | J |
| 5 | K |
| 5 and 6 | L |
| 6 | M |
| 4 and 7 | N |
| 5 and 8 | O |
| 6 and 9 | P |
| 7 | Q |
| 7 and 8 | R |
| 8 | S |

| Keypad Signal(s) | Letter |
| --- | --- |
| 8 and 9 | T |
| 9 | U |
| 7 and * | V |
| 8 and 0 | W |
| 9 and # | X |
| * | Y |
| * and 0 | Z |
| 0 | Space |
| 0 and # | @ |

Other adaptations may be implemented to further increase the capabilities of the input keypad 201. For example, another overlay scheme may be used when the keypad is in numerical mode. Thus, the associated device 601 includes a numerical/alphabetic mode toggle switch 607. If the toggle switch 607 is in alphabetic mode, the processor 605 is instructed to interpret the signals from the input keypad 201 as described above. However, if the toggle switch 607 is in numerical mode, then the processor 605 interprets the signals differently. For example, if only one individual key is depressed in numerical mode, the processor 605 interprets this as the numerical digit associated with the key. However, if two keys are depressed, then the processor 605 interprets this as a predetermined character, such as punctuation marks or special characters. The function of switch 607 can also be automatically performed by processor 605 depending on the current context.

Moreover, as a further adaptation, a shift or function key 609 is used to switch between upper and lower case alphabetic modes. Thus, the processor 605 interprets the signals from the input keypad 201 as uppercase if the shift key 609 has been depressed.

As yet a further adaptation, the input keypad can be used to emulate "alpha" dialing. Alpha dialing is the practice of using words as a mnemonic tool for remembering telephone numbers. For example, instead of trying to remember the phone number 1-800-225-5288 it is easier to remember 1-800-CALL-ATT. The use of alpha dialing is commonly used by telephone users and companies alike.

Figure 1:
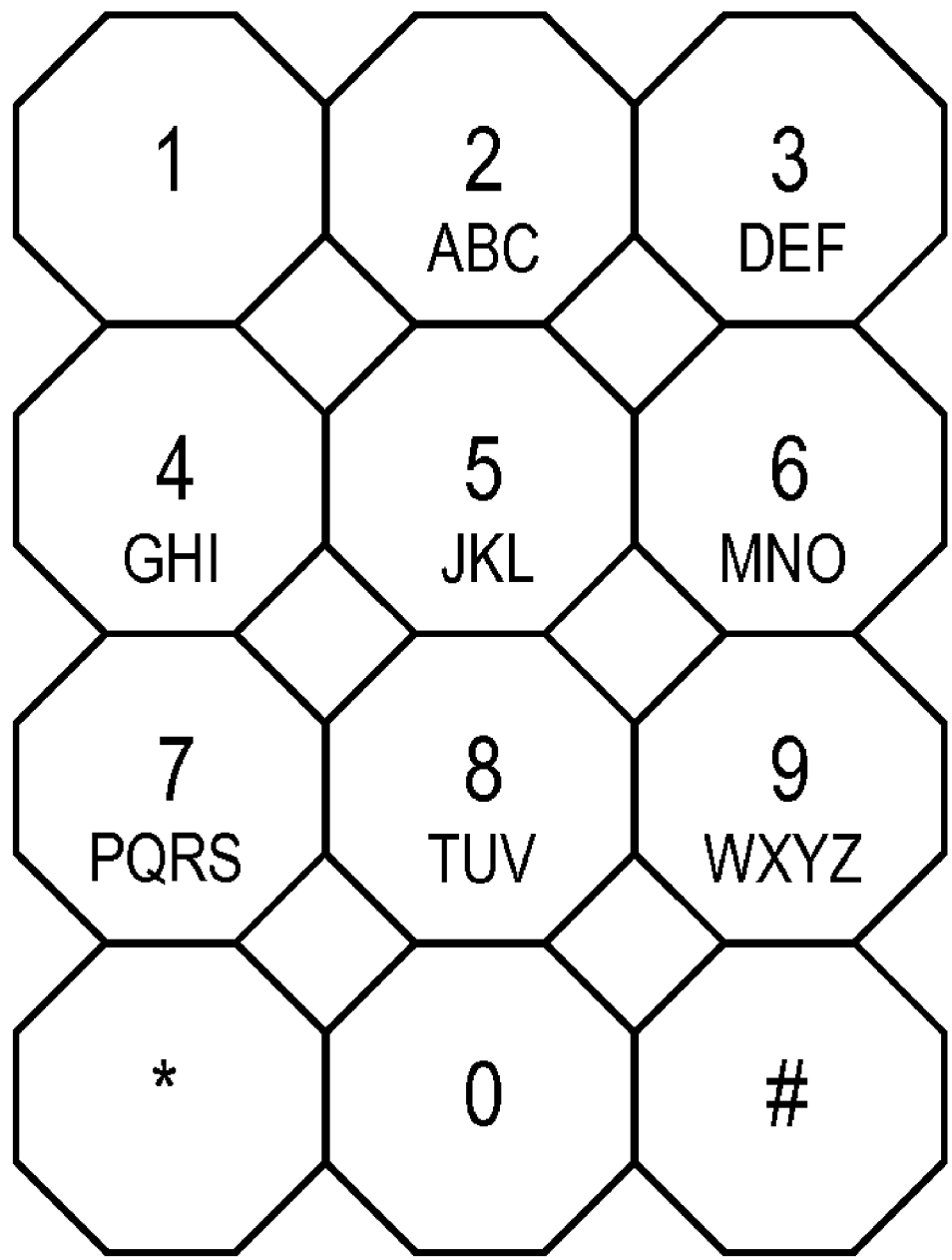
FIG. 1° is an illustration of a prior art input keypad.

The input keypad of the present invention may easily be used to facilitate alpha dialing. In such a case, a reverse mapping is needed from alphabetic characters to numbers. There are two ways of doing this. In the first method, the keys of the input keypad may be imprinted with the conventional numeral and letter combinations as shown in FIG. 1. Additionally, the keys would also be imprinted with the alphabetic mode letters such as shown in FIG. 2. This approach will result in a cluttered input keypad appearance that would be confusing to the novice user.

A second approach would have the processor 605 emulate the reverse mapping. For example, assume that the number 1-800-CALL-ATT is being dialed. Therefore, the toggle switch 607 is in numeric mode. The user would then dial 1, 8, 0, 0, ALPHA (by depressing the toggle switch 607), C, A, L, L, A, T, T. This way, knowing that a telephone number is being dialed, the processor 605 can interpret the alpha characters (CALLATT) and using a look up table or the like, map the letters into numerals (e.g. 225-5288).

Figure 5:
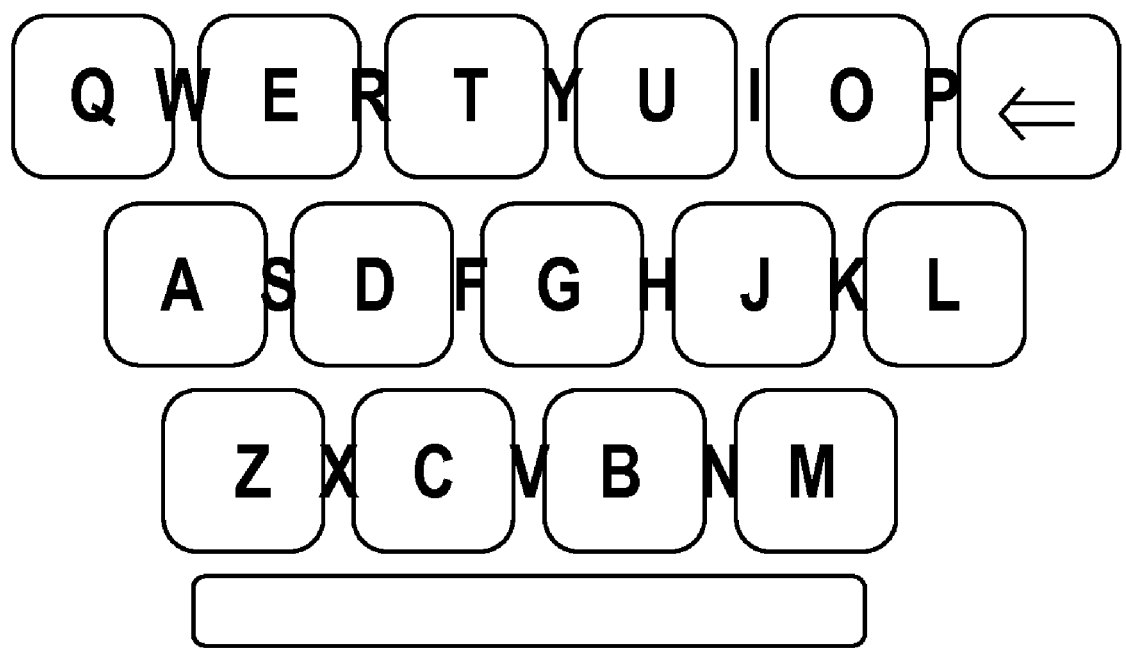
FIG. 5° is an alternative embodiment of an alphabetic input keypad formed in accordance with the present invention.

Furthermore, the present invention is not limited to input keypads of size 3×4. In fact, the present invention may be applied to an input keypad having any size and shape. The only requirement is that the input keypad be adapted to allow for the easy depression of two adjacent keys. A size reduced "QWERTY" input keyboard is shown in FIG. 5°. Note that it is approximately only 60% of the width of a traditional keyboard.

While the preferred embodiment of the invention has been illustrated and described, it will be appreciated that various changes can be made therein without parting from the spirit of scope of the invention. The current invention has been described in relation to a preferred embodiment. One of ordinary skill after reading the foregoing specification will be able to affect various changes, alterations, and substitutions or equipment without departing from the broad concepts disclosed. It is therefore intended that the scope with the Letters Patent granted hereon be limited only by the definition contained in the affirmative claims and the equivalents thereon, and not by limitations of the embodiments described herein.

What is claimed is:

1. A mobile telephone, comprising:
   a processor;
   memory in communication with the processor; and
   a keyboard having a plurality of regular keys corresponding to numeric input and a plurality of interstitial keys positioned between at least two adjacent regular keys, the interstitial keys corresponding to an alphabetic input,
   wherein the memory stores a set of rules which when executed by the processor enable the processor to interpret alpha-dialing keyboard input as number keyboard input.

2. The mobile telephone of claim 1, wherein the interstitial keys are raised as compared to the regular keys.

3. The mobile telephone of claim 2, wherein the interstitial keys have a different size as compared to the regular keys.

4. The mobile telephone of claim 2, wherein the interstitial keys have a different shape as compared to the regular keys.

5. The mobile telephone of claim 1, wherein the interstitial keys are electrically active.

6. The mobile telephone of claim 5, wherein each interstitial key outputs a respective electrical signal when depressed.

7. The mobile telephone of claim 1, wherein the set of rules includes a mapping of alphabetic characters to corresponding numbers to support alpha-dialing.

8. The mobile telephone of claim 7, wherein the mapping is provided in a look up table.

9. The mobile telephone of claim 1, wherein the regular keys corresponding to numeric input are arranged in an array having three columns and four rows.

* * * * *